(12) United States Patent
Blum et al.

(10) Patent No.: US 11,263,693 B1
(45) Date of Patent: Mar. 1, 2022

(54) CENTRAL RISK PRICING SYSTEM AND METHOD

(71) Applicant: Fannie Mae, Washington, DC (US)

(72) Inventors: Roger Blum, Washington, DC (US); Mike Smale, Washington, DC (US); Juoaquina Washington, Washington, DC (US); Kelly Kraus, Washington, DC (US)

(73) Assignee: Fannie Mae, Washington, DC (US)

( * ) Notice: Subject to any disclaimer, the term of this patent is extended or adjusted under 35 U.S.C. 154(b) by 714 days.

(21) Appl. No.: 14/516,377

(22) Filed: Oct. 16, 2014

Related U.S. Application Data

(60) Provisional application No. 61/892,208, filed on Oct. 17, 2013.

(51) Int. Cl.
  *G06Q 40/04* (2012.01)
  *G06Q 30/02* (2012.01)

(52) U.S. Cl.
  CPC ......... *G06Q 40/04* (2013.01); *G06Q 30/0283* (2013.01)

(58) Field of Classification Search
  CPC ...... G06Q 40/02; G06Q 40/025; G06Q 50/16; G06Q 40/06; G06Q 30/0283; G06Q 40/04
  USPC .................................................... 705/35–45
  See application file for complete search history.

(56) References Cited

U.S. PATENT DOCUMENTS

| | | | | |
|---|---|---|---|---|
| 4,774,664 A | * | 9/1988 | Campbell | G06Q 20/40 700/90 |
| 5,966,700 A | * | 10/1999 | Gould | G06Q 40/00 705/35 |
| 6,070,151 A | * | 5/2000 | Frankel | G06Q 40/02 705/36 R |
| 6,691,094 B1 | * | 2/2004 | Herschkorn | G06Q 30/0611 705/26.4 |
| 7,461,020 B2 | | 12/2008 | Kemper et al. | |

(Continued)

OTHER PUBLICATIONS

Anonymous, "Tradeweb; Major Market Participants Join Tradeweb to create innovative solution for Systemic Fails on MBS trades", Technology & Business Journal; Atlanta, Dec. 14, 2010, pp. 1-4.*

(Continued)

*Primary Examiner* — Mohammad Z Shaikh
(74) *Attorney, Agent, or Firm* — Foley & Lardner LLP

(57) ABSTRACT

A pricing administration and calculation tool comprises user interface logic, pricing administration logic and pricing calculation logic that cooperates with the user interface logic to generate display screens configured to receive user inputs specifying credit guarantee pricing and user inputs specifying terms and conditions for mortgage backed security (MBS) loan commitments. The inputs are specific to individual external user (seller). The credit guarantee price is a fee for guaranteeing to an investor the timely payment of principal and interest from the mortgages underlying a mortgage backed security. The credit guarantee pricing may be specified via the display screens on a seller-by-seller basis, a mortgage product-by-product basis, an issue month-by-issue month, and a coupon-by-coupon basis. A committing tool comprises committing logic that cooperates with the user interface logic to generate display screens configured to receive user inputs from external user (seller) to enter into MBS loan commitments.

20 Claims, 24 Drawing Sheets

(56) References Cited

U.S. PATENT DOCUMENTS

| | | | | |
|---|---|---|---|---|
| 7,512,559 B1* | 3/2009 | Snyder | G06Q 40/04 | 705/37 |
| 7,747,519 B2* | 6/2010 | Kemper | G06Q 40/02 | 705/38 |
| 7,747,526 B1* | 6/2010 | Palumbo | G06Q 20/102 | 705/40 |
| 7,809,633 B2* | 10/2010 | Nolan, III | G06Q 40/00 | 705/38 |
| 7,882,025 B1* | 2/2011 | Seal | G06Q 40/02 | 705/38 |
| 7,885,889 B2 | 2/2011 | Oppenheimer et al. | | |
| 7,885,891 B1* | 2/2011 | Washington | G06Q 40/025 | 705/38 |
| 7,904,381 B1* | 3/2011 | Tatang | G06Q 40/025 | 705/38 |
| 7,941,394 B2* | 5/2011 | Error | G06F 16/958 | 707/600 |
| 8,013,575 B2* | 9/2011 | Aradachi | H02J 7/0031 | 320/128 |
| 8,032,450 B2* | 10/2011 | Kemper | G06Q 20/206 | 705/38 |
| 8,065,211 B2* | 11/2011 | Kemper | G06Q 40/10 | 705/35 |
| 8,065,225 B1* | 11/2011 | Lewis, Jr | G06Q 40/00 | 705/35 |
| 8,442,908 B2* | 5/2013 | Niccolini | G06Q 30/0278 | 705/35 |
| 8,639,614 B2* | 1/2014 | Greenland, II | G06Q 40/04 | 705/38 |
| 8,781,941 B2* | 7/2014 | Dwin | G06Q 20/023 | 705/37 |
| 8,799,127 B1* | 8/2014 | Blair | G06Q 40/025 | 705/35 |
| 9,313,209 B2* | 4/2016 | Corr | G06F 3/04842 | |
| 10,026,124 B2* | 7/2018 | Barry | G06Q 40/04 | |
| 2001/0047326 A1* | 11/2001 | Broadbent | G06Q 10/10 | 705/38 |
| 2002/0143662 A1* | 10/2002 | Clark | G06Q 30/06 | 705/26.8 |
| 2003/0006994 A1 | 1/2003 | Suzuki | | |
| 2003/0018558 A1 | 1/2003 | Heffner et al. | | |
| 2003/0036994 A1* | 2/2003 | Witzig | G06Q 10/10 | 705/38 |
| 2003/0135447 A1 | 7/2003 | Blanz et al. | | |
| 2003/0144949 A1* | 7/2003 | Blanch | G06Q 30/06 | 705/38 |
| 2004/0030638 A1* | 2/2004 | Dwin | G06Q 20/023 | 705/38 |
| 2004/0128235 A1* | 7/2004 | Kemper | G06Q 20/10 | 705/39 |
| 2005/0080722 A1* | 4/2005 | Kemper | G06Q 40/02 | 705/38 |
| 2005/0102229 A1* | 5/2005 | Kemper | G06Q 20/206 | 705/39 |
| 2005/0125334 A1* | 6/2005 | Masella | G06Q 40/02 | 705/38 |
| 2005/0203839 A1* | 9/2005 | Dowell | G06Q 40/02 | 705/39 |
| 2005/0273408 A1* | 12/2005 | Bandman | G06Q 20/027 | 705/35 |
| 2005/0278249 A1* | 12/2005 | Jones | G06Q 40/02 | 705/38 |
| 2006/0020538 A1* | 1/2006 | Ram | G06Q 30/0222 | 705/37 |
| 2006/0080229 A1* | 4/2006 | Masella | G06Q 40/025 | 705/38 |
| 2006/0253360 A1* | 11/2006 | Gould | G06Q 40/06 | 705/35 |
| 2007/0050284 A1* | 3/2007 | Freeman | G06Q 40/02 | 705/38 |
| 2009/0240609 A1* | 9/2009 | Cho | G06Q 40/02 | 705/30 |
| 2009/0281952 A1* | 11/2009 | Toffey | G06Q 40/00 | 705/80 |
| 2010/0169205 A1* | 7/2010 | Labuszewski | G06Q 40/02 | 705/37 |
| 2011/0016042 A1* | 1/2011 | Cho | G06Q 40/025 | 705/38 |
| 2011/0055114 A1* | 3/2011 | Perez | G06Q 40/00 | 705/36 R |
| 2011/0187710 A1* | 8/2011 | Giovinazzi | G06T 15/00 | 345/419 |
| 2012/0116944 A1* | 5/2012 | DiCarlo | G06Q 40/025 | 705/37 |
| 2012/0317016 A1* | 12/2012 | Hughes | G06Q 40/025 | 705/38 |
| 2013/0218807 A1* | 8/2013 | Liao | G06Q 40/06 | 705/36 R |
| 2013/0339219 A1* | 12/2013 | Bernheimer | G06Q 40/025 | 705/38 |
| 2014/0156502 A1* | 6/2014 | Orso | G06Q 20/02 | 705/38 |
| 2014/0236860 A1* | 8/2014 | Camrass | G06Q 40/04 | 705/36 R |

OTHER PUBLICATIONS

B. Kelvie and M. Kraft, "Technology in the mortgage industry: the Fannie Mae experience," in IT Professional, vol. 4, No. 3, pp. 27-32, May-Jun. 2002. (Year: 2002).*

* cited by examiner

| Pricing Utility Administration | Pricing | Sellers | Products | | Change List ▶ |
|---|---|---|---|---|---|
| Seller Selection | Filter Sellers | | Bank 111: 23373-001-7 | Edit \| History | No pending changes — 214 |

200
201

Seller Selection list (202):
- [ ] Bank 000
- ∨ Bank 111  204
  - 999999-1
  - 999999-2
  - 999999-3
  - 999999-4
  - 999999-5
  - 999999-6
  - 999999-7
- ∨ Bank 222
- ∨ Bank 333
- ∨ Bank 444
- ∨ Bank 555

206 (brace around 999999-1 through 999999-7)

Seller Name: Bank 111
Parent Entity: Name 111
Seller Number: 999999-1
Seller Status: Active
Seller Field 5: PD   210
Seller Field 6: 
MBS Eligibility: Eligible

208

Available for Committing | Commitment Level: Enabled ■ | Product Group □ Disabled  226

- ☐ Product1 L1
- ☐ Product2 L1
- ☐ Product3 L1
- ☑ Product4 L1 ⌒ 216
  - ☑ Product 4.1 L2 ⌒ 218
    - Product 4.1.1 L3 ⌒ 222
- ☑ Product5 L1 ⌒ 220
  - ☑ Product5.1 L2 ⌒ 224
  - ☑ Product5.2 L2 ⌒ 224

212

230  Submit Changes

| | |
|---|---|
| Seller Attribute 1 | Active |
| Seller Attribute 2 | PD |
| Seller Attribute 3 | |
| Seller Attribute 4 | ☑ |
| Commitment Attribute 1 | Yes |
| Commitment Attribute 2 | Product Group ▼ — 402 |
| Commitment Attribute 3 | $99,999,999 — 404 |
| Commitment Attribute 4 | $99,999,999 — 406 |
| Commitment Attribute 5 | $99,999,999 — 410 |
| Commitment Attribute 6 | Early ▼ |
| Commitment Attribute 7 | 99.99 bps |
| Commitment Attribute 8 | 99.99 bps |
| Commitment Attribute 9 | 99.99bps |
| Commitment Attribute 10 | XXXXXXX ▼ |
| Commitment Attribute 11 | XXXXXXX |
| Commitment Attribute 12 | Fannie Mae ▼ |
| Commitment Attribute 13 | 99.99% — 412 |
| Commitment Attribute 14 | $99,999,999 — 414 |
| Commitment Attribute 15 | 999.99% — 416 |
| Commitment Attribute 16 | $99,999,999 — 418 |
| Commitment Attribute 17 | 99.99% |
| Commitment Attribute 18 | 99.99 bps — 420 |
| Commitment Attribute 19 | 99.99 bps — 422 |
| Commitment Attribute 20 | ☐ |

FIG. 4

Make MBS Commitment — 500

| | |
|---|---|
| Commit | |
| Open Commitments | Seller Number: 999999-1 |
| Closed Commitments | Commitment Amount: $99,999,999 — 502 |
| Browse Prices | Month of Issue: October 2013 ▼ — 504 |
| Fees | |
| User Settings | |
| Sys. Settings | |
| Seller Profile | |

[Get Pricing] — 510

| Product 506 | Product Attributes 508 | |
|---|---|---|
| Product1 L1 | Product 1.1 L2 | |
| | Product Attribute 1 | [Value 1] |
| | Product Attribute 2 | [Value 2] |
| | Product Attribute 3 | [Value 3] |
| | Product Attribute 4 | [Value 4] |
| | Product Attribute 5 | [Value 5] |
| | Product Attribute 6 | [Value 6] |
| | Product Attribute 7 | [Value 7] |
| | Product Attribute 8 | [Value 8] |
| | Product Attribute 9 | [Value 9] |
| | Product Attribute 10 | [Value 10] |
| | Product Attribute 11 | [Value 11] |
| | Product Attribute 12 | [Value 12] |
| | Product Attribute 13 | [Value 13] |
| | Product Attribute 14 | [Value 14] |
| | Product Attribute 15 | [Value 15] |

FIG. 5

Browse Prices

610 — Commit

- Open Commitments
- Closed Commitments
- Browse Prices
- Fees
- User Settings
- Sys. Settings
- Seller Profile

600

Product: Search for Products...

- ☑ Product1 L1
- ☑ Product2 L1
- ☑ Product3 L1
- ☐ Product4 L1
- ☐ Product5 L1

99.99 to 99.99

0   5   10   15   20

| Coupon | Sep 2013 | Oct 2013 | Nov 2013 | Dec 2013 |
|---|---|---|---|---|
| 99.99 | 99 | 99 | 99 | 99 |
| 99.99 | 99 | 99 | 99 | 99 |
| 99.99 | 99 | 99 | 99 | 99 |
| 99.99 | 99 | 99 | 99 | 99 |
| 99.99 | 99 | 99 | 99 | 99 |
| 99.99 | 99 | 99 | 99 | 99 |
| ▼ Product1 L1 | | | | |
| 9999-9999 | NA | NA | NA | NA |
| 9999-9999 | 99 | 99 | 99 | 99 |
| 9999-9999 | 99 | 99 | 99 | 99 |
| 9999-9999 | 99 | 99 | 99 | 99 |
| 9999-9999 | 99 | 99 | 99 | 99 |
| 9999-9999 | 99 | 99 | 99 | 99 |
| 9999-9999 | 99 | 99 | 99 | 99 |
| ▶ Product2 L1 | | | | |
| ▶ Product3 L1 | | | | |
| ▶ Product4 L1 | | | | |
| ▶ Product5 L1 | | | | |
| ▶ Product6 L1 | | | | |
| ▶ Product7 L1 | | | | |
| ▶ Product8 L1 | | | | |
| ▶ Product9 L1 | | | | |

FIG. 6

GFee Pricing 700

Product1 L1

| | | | |
|---|---|---|---|
| Standard Product | Negotiated | Balloon Mortgage | No |
| Bond Type | None | Express Product Code(s) | N/A |
| Amortization Type | ARM | Minimum Servicing Fee | N/A |
| Loan Type | FHA/VA 710 | Maximum Servicing Fee | N/A |
| Lien Type | First Lien | Minimum Loan-To-Value | N/A |
| Original Term | > 240 <= 360 | Maximum Loan-To-Value | N/A |
| Min. Original Term | N/A | Minimum CLTV | N/A |
| Max. Original Term | N/A | Maximum CLTV | N/A |
| Plan Number(s) | 660: 660-5/1YR TREASURY 2 and 5 Caps | Minimum Loan Amount | N/A |
| | 661: 661-5/1YR TREASURY,COVERTIBLE 2 and 5 Caps | Maximum Loan Amount | N/A |
| | | First Time Home Buyer | N/A |
| | 3262: 3262-5/1LIBOR 5, 2 and 5 caps | Minimum Debt-to-Income Ratio | N/A |
| Special Feature Code(s) | | Maximum Debt-to-Income Ratio | N/A |
| Future Feature Code(s) | | ARM Pooling Structure | ARM FLEX |
| Interest Only | No | Convertible ARM Takeout Option | N/A |
| Interest Only Period | N/A | Assumable | No |
| | | Seasoning | Both |

705

| Coupon | GFee |
|---|---|
| 2.000 | 99.99 |
| 2.500 | 88.88 |
| 3.000 | 77.77 |
| 3.500 | 66.66 |
| 4.000 | 55.55 |
| 4.500 | 44.44 |

712 — Time Remaining to Accept: 4:51

716

[ Accept ]    Password: [           ]

720                                  714

[ Reject ]

| Commit | System Settings |  |
|---|---|---|
| | Modify | |
| Open Commitments | General Settings | |
| Closed Commitments | Time to Accept Commitment (Minutes)<br>The time limit for users to accept a commitment before the offer expires | 60 |
| Browse Prices | Closed Commitment Timeframe (Months)<br>The number of months commitment persists in the list of closed commitments | 6 |
| Fees | | |
| User Settings | Minimum Commitment Amount (Dollars)<br>Minimum commitment amount that can be proposed | 1000 |
| Sys. Settings | Market Availability | |
| Seller Profile | Market Window<br>Hours during which commitment can be made | 08:00 –<br>16:00 EST |
| | After Market Window<br>After hours during which commitment can be made | None |
| | Holidays<br>Additional holidays beyond those covered by calendar | None |
| | Early Market Close<br>Days that the market closes early and the specified closing times | None |
| | Month of Issue Lockout (Days)<br>Last day to create a new commitment or negotiate commitments for the current month of issue. The parameter is the number of business days to subtract from the last business day of the month | 5 |

FIG. 8

Commitment Details 900

Roll | Pair-Off | Cancel Roll

Outstanding Balance $99,999,999 — 910

Roll Amount [ $99,999,999 - $99,999,999 ] — 912

Roll Outstanding Balance [ ] — 914

New Month of Issue [ November 2013 ] — 916

Existing Commitment

Outstanding Balance $99,999,999
Month of Issue October 2013
Product(s) Product1 L1

Roll Amount
$99,999,999 ⟶

New Commitment 920

Commitment Amount $99,999,999
New Month of Issue November 2013
Product(s) Product1 L1

Cancel | Calculate Fee — 917

FIG. 9

Commitment Details

Pair-off

| | |
|---|---|
| | Cancel Pair-Off   Roll |

Outstanding Balance (Pre Pair-off)    $1,000,0

Pair-off Amount    [ 500000 ]   $1-$1,000,000.00

Pair-off Outstanding Balance    ☐

Outstanding Balance (Post Pair-off)    $500,000    [ Cancel ]   [ Calculate Fee ]

General

| | | |
|---|---|---|
| Contract Number | P000QL | |
| Commitment Amount | $1,000,000 | Seller Name | Bank 111 |
| Outstanding Balance | $1,000,000 | Seller Number | 23373-001-7 |
| Product(s) | 20-40 FRM | Commitment Date | 3/14/14 3:24 PM |
| Issue Month | Mar 2014 | | |

◀ More Details

FIG. 11A

Commitment Details

Pair-off                                   [Cancel Pair-Off]  [Roll]

Pair-off Fee                  $5,000.00

Pair-off Amount               $500,000

Outstanding Balance (Post Pair-off)   $500,000

General                                    [Reject]  [Accept]

Contract Number       P000QL        Seller Name

Commitment Amount     $1,000,000    Seller Number       Bank 111

Outstanding Balance   $1,000,000    Commitment Date     23373-001-7

Product(s)            20-40 FRM                         3/14/14 3:24 PM

Issue Month           Mar 2014

FIG. 11B

Pair-off Accepted

Commitment Details

Pair-off        Pair-off    Roll

General

| | | | |
|---|---|---|---|
| Contract Number | P000QL | Seller Name | Bank 111 |
| Commitment Amount | $500,000 | Seller Number | 23373-001-7 |
| Outstanding Balance | $500,000 | Commitment Date | 3/14/14 3:24 PM |
| Product(s) | 20-40 FRM | | |
| Issue Month | Mar 2014 | | |

More Details

Guaranty Fee Pricing

20YR FRM

| Coupon | Guaranty Fee |
|---|---|
| 2.000 | 47.00 |
| 2.500 | 47.00 |

FIG. 11C

Commitment Activity  1200

| Date/Time | User Name | Activity Type | Activity Amount | Commitment Amount | Outstanding Balance | Fees | Comments |
|---|---|---|---|---|---|---|---|
| ◀ 9/13/13 1:44 PM | John Doe | New Commitment | $99,999,999 | $99,999,999 | $99,999,999 | N/A | 💬 |
| ◀ 9/13/13 1:51 PM | John Doe | Roll | $99,999,999 | $99,999,999 | $99,999,999 | $99,999 | 💬 |
| ◀ 9/13/13 1:53 PM | John Doe | Pair-Off | $99,999,999 | $99,999,999 | $99,999,999 | $99,999 | 💬 |
| Current Amount | | | | $99,999,999 | $99,999,999 | $99,999 | |

FIG. 12

Commitment Details

[Pair-Off] [Roll]

General

| | | | |
|---|---|---|---|
| Contract Number | P000QL | Seller Name | Bank 111 |
| Commitment Amount | $300,000 | Seller Number | 23373-001-7 |
| Outstanding Balance | $300,000 | Commitment Date | 3/14/14 3:24 PM |
| Product(s) | 20-40 FRM | | |
| Issue Month | Mar 2014 | | |

▼More Details

| | | | |
|---|---|---|---|
| Min Delivery Amount | $285,000 | Remittance Cycle | Standard |
| Max Delivery Amount | $315,000 | Remittance Cycle: Day of Month | 18 |
| Fulfilled Amount | $0 | Servicing Option | Special |
| Pending Amount | $0 | Participation Percentage | 100% |
| Min Remaining Amount | $285,000 | Buyup/Buydown Grid | Early |
| Max Remaining Amount | $315,000 | Max Buyup Amount | 25.00 bps |
| Pair-off Fee Factor | 100.00 bps | | |
| Roll Fee Factor | 5.00 bps | | |
| Rolled To | P000QM | | |

Guaranty Fee Pricing

▼20YR FRM

| | | | |
|---|---|---|---|
| Amortization Type | Fixed Rate | Loan Type | Conventional |
| Min Original Term | 181 months | Lien Type | First Lien |
| Max Original Term | 240 months | Seasoning | Current or Seasoned |
| Assumable | No | Standard Product | Standard |
| Min Servicing Fee | 25.00 bps | Foreclosure Loss Risk | Fannie Mae |

| Coupon | Guaranty Fee |
|---|---|
| 2.000 | 47.00 |
| 2.500 | 47.00 |
| 3.000 | 47.00 |
| 3.500 | 47.00 |

Commitment Activity

| | Date/Time | User Name | Activity Type | Activity Amount | Commitment Amount | Outstanding Balance | Fees | Comments |
|---|---|---|---|---|---|---|---|---|
| ▲ | 3/14/14 3:25 PM | John Doe | New Commitment | $1,000,000 | $1,000,000 | $1,000,000 | N/A | ⓠ |
| ▲ | 3/14/14 3:34 PM | John Doe | Roll | $500,000 | $500,000 | $500,000 | $5,000.00 | ⓠ |
| ▲ | 3/14/14 4:52 PM | John Doe | Pair-Off | $200,000 | $300,000 | $300,000 | $100.00 | ⓠ |
| Current Amount | | | | | $300,000 | $300,000 | $5,100.00 | |

FIG. 13

Open Commitments

Overview

| | | Group By | Product ▼ |
|---|---|---|---|
| Total Fulfilled/Pending | $0 | | |
| Total Max Remaining | $101,964,211 | | |
| Total Commitments | 33 | | |

| Product | Commitments | ■ Fulfilled/Pending | ▨ Max Remaining |
|---|---|---|---|
| 10-15 FRM | 15 | $0 | $15,864,211 |
| 20-40 FRM | 13 | $0 | $60,900,000 |
| ARM | 4 | $0 | $14,700,000 |
| TEST FAMILY | 1 | $0 | $10,500,000 |

| Contract Number | Seller Number | Commitment Date | Issue Month | Commitment Amount | Fulfilled Amount | Pending Amount | Pair-off Amount |
|---|---|---|---|---|---|---|---|
| P000QE | 23373-001-7 | 02/28/2014 | Feb 2014 | $200,000 | $0 | $0 | $0 |
| ▼ 20YR FRM | | | Count: 13 | $58,000,000 | $0 | $0 | $1,000,000 |
| P000PZ | 23373-001-7 | 02/19/2014 | Mar 2014 | $10,000,000 | $0 | $0 | $0 |
| P000Q2 | 23373-001-7 | 02/19/2014 | Mar 2014 | $1,000,000 | $0 | $0 | $0 |
| P000Q3 | 23373-001-7 | 02/19/2014 | Apr 2014 | $8,000,000 | $0 | $0 | $0 |
| P000Q9 | 23373-001-7 | 02/19/2014 | Mar 2014 | $10,000,000 | $0 | $0 | $0 |
| P000QA | 23373-001-7 | 02/27/2014 | Mar 2014 | $1,000,000 | $0 | $0 | $0 |
| P000QC | 23373-001-7 | 02/28/2014 | Feb 2014 | $5,000,000 | $0 | $0 | $0 |
| PW002W | 23373-001-7 | 02/28/2014 | Mar 2014 | $7,000,000 | $0 | $0 | $1,000,000 |
| P000QD | 23373-001-7 | 02/28/2014 | Apr 2014 | $2,000,000 | $0 | $0 | $0 |
| P000QF | 23373-001-7 | 02/28/2014 | May 2014 | $1,000,000 | $0 | $0 | $0 |
| P000QG | 23373-001-7 | 03/13/2014 | Mar 2014 | $1,000,000 | $0 | $0 | $0 |
| P000QJ | 23373-001-7 | 03/14/2014 | Mar 2014 | $1,000,000 | $0 | $0 | $0 |
| P000QK | 23373-001-7 | 03/14/2014 | Mar 2014 | $1,000,000 | $0 | $0 | $0 |
| P000QL | | | | | | | |
| ◀ ARM | | | Count: 4 | $14,000,000 | $0 | $0 | $1,000,000 |
| ◀ TEST FAMILY | | | Count: 1 | $10,000,000 | $0 | $0 | $0 |

FIG. 14

Closed Commitments

Commit

Contract Number 🔍
Open Commitments
Closed Commitments
Browse Prices
User Settings

Overview

Total Fulfilled  $0
Total Fallout  $0
Total Commitments  0

Group By [Product ▼]

■ Fulfilled    ▧ Fallout

| Contract Number | Seller Number | Commitment Date | Issue Month | Commitment Amount | Fulfilled Amount | Pending Amount | Pair-off Amount |
|---|---|---|---|---|---|---|---|
| | | | | | | | |

FIG. 15

Settings

Email Notification List

| First Name | Last Name | Phone Number | Email | |
|---|---|---|---|---|
| John | Doe | 555-555-5555 | johndoe@example.com | [Modify] |
| Jane | Doe | 555-555-5556 | janedoe@example.com | |

Pricing & Execution - MBS

Acting As Agent For: John Doe | Bank 111 – 23373-001-7 - Active                                   Stop Acting As Agent

[Commit]

[Negotiate]

Make MBS Commitments

Contract Number 🔍          Overview

Open Commitments            Seller Number        23373-001-7
Closed Commitments          Commitment Amount   $999,999
Act as Agent                Issue Month         Mar 2014 ▶              [Get Pricing]

Browse Prices
User Settings                                                    Product Attributes
System Settings

| Product    |                                     |
|------------|-------------------------------------|
| 10-15 FRM  | 20YR FRM                            |
| 20-40 FRM  | 30YR FRM                            |
| ARM        | 30YR FRM AGFIRST Variance           |
|            | 30YR FRM HIGH BALANCE               |
|            | 30YR FRM MCM                        |
|            | 30YR FRM Refi Plus LTV 105.01-125   |
|            | 30YR FRM Refi Plus LTV>125          |

FIG. 17C

Pricing & Execution - MBS

Acting As Agent For: John Doe | Bank 111 – 23373-001-7 - Active     Stop Acting As Agent

| | |
|---|---|
| Commit | |
| Negotiate | |

Negotiated Commitment

Contract Number 🔍

Open Commitments
Closed Commitments
Act as Agent
Browse Prices
User Settings
System Settings

General

| | | | | |
|---|---|---|---|---|
| Seller Name | Bank 111 | Buyup/Buydown Grid | Early ▶ | |
| Seller Number | 23373-001-7 | Max Buyup Amount | 25.00 bps | |
| Commitment Date | 3/14/14 4:28 PM | Min Guaranty Fee After Buydown | 0.00 bps | |
| Commitment Status | Pending | Remittance Cycle | Standard ▶ | |
| Issue Month | Mar 2014 ▶ | Remittance Cycle: Day of Month | 18 | |
| Commitment Amount | | Servicing Option | Special ▶ | |
| Low Tolerance Percentage | 5% | Participation Percentage | 100% | |
| Low Tolerance Floor Amount | $0 | Pai-off Fee Factor | 100.00 bps | |
| Min Delivery Amount | | Roll Fee Factor | 5.00 bps | |
| High Tolerance Percentage | 5% | | | |
| High Tolerance Floor Amount | $0 | | | |
| Max Delivery Amount | | | | |

Guaranty Fee Pricing    [Add Products]

◂ 30YR FRM

| Coupon | Guaranty Fee |
|---|---|
| 2.000 | 47.00 |

[Remove Product]

● Private (Internal)    ○ Public (Internal & External)

Comments

[ Clear ] [ Create Commitment ]

FIG. 18

| Pricing Utility | Pricing | Sellers | Products | Approvals | | | | | |
|---|---|---|---|---|---|---|---|---|---|
| Pending Approval | Changes Pending Approval | | | | | | | | |
| Pending Effective Date | Approve Selected / Reject Selected | Filters | All Changes ▼ | All Team Codes ▼ | | Approval Levels 1 ☑ 2 ☑ 3 ☑ | | | |
| Administer | ▶ Pricing Changes | | | | | | | | |
| Price Approvers | ☐ Submitted Date ▶ | Submitter | Seller | Product | Issue Month | Coupon | Current Value | New Value | Effective Date | Team Code |
| Product Approvers | ☑ 4/2/14 6:58 PM... | J. Doe | Multi(2) | Multi(2) | Multi(7) | Multi(13) | | Multi(364) to | Upon Approval | PD |
| Seller Levels | ▶ Seller Changes | | | | | | | | |
| | ☐ Submitted Date ▶ | Submitter | Seller | | Field | | Current Value | New Value | Effective Date | |
| | ☑ 4/2/14 6:58 PM... | J. Doe | 23373-000-9 | | Eligible Products | | | | Upon Approval | PD |
| | ☑ 4/2/14 7:00 PM... | J. Doe | 23373-001-7 | | Eligible Products | | | | Upon Approval | PD |
| | ▶ Product Changes | | | | | | | | |
| | ☐ Submitted Date ▶ | Submitter | Product | | Field | | Current Value | New Value | Effective Date | |

| From: |
| To: |
| Cc: |
| Subject: |

| MBS Guaranty Fee Commitment Roll Confirmation | |
|---|---|
| Seller Name/Number: | Bank 111 / 233730017 |
| Submitted By: | John Doe |
| Roll Date-Time: | 05/07/2014 15:04:42 EDT |
| | |
| Rolled From | |
| Contract Number: | P0019Q |
| Outstanding Balance (pre roll): | $750,000 |
| Roll Amount: | $250,000 |
| Outstanding Balance (post roll): | $500,000 |
| | |
| Rolled To | |
| Contract Number: | P0019U |
| Commitment Amount: | $250,000 |
| | |
| Product(s): | 20-30 FRM |
| Month of Issue: | June 2014 |
| | |
| Roll fee: | $125.00 |

FIG. 21

CENTRAL RISK PRICING SYSTEM AND METHOD

CROSS-REFERENCE

This application claims the benefit of priority from U.S. Provisional Application 61/892,208, filed Oct. 17, 2013, entitled "Central Risk Pricing System and Method", incorporated herein by reference in its entirety.

BACKGROUND

The present disclosure generally relates to computer systems and methods used to process data pertaining to pricing credit guarantees for mortgage loans sold into the secondary market.

SUMMARY

One embodiment of the present disclosure relates to a computer system comprising at least one processor and non-transitory computer readable media having instructions stored therein. The instructions, when executed by the at least one processor, cause the at least one processor to implement a pricing administration tool comprising user interface logic and pricing administration logic. The user interface logic is configured to generate display screens for presentation via a user device coupled to the computer system via a communication network. The pricing administration logic cooperates with the user interface logic to generate display screens configured to receive user inputs specifying credit guarantee pricing and user inputs specifying terms and conditions for mortgage backed security (MBS) loan commitments specific to individual sellers. The credit guarantee pricing and other MBS terms and conditions may be specified via the display screens on a seller-by-seller basis, coupon-by-coupon, issue month-by-issue month, and on a product-by-product basis.

Another embodiment of the present disclosure relates to a computer system comprising at least one processor and non-transitory computer readable media having instructions stored therein. The instructions, when executed by the at least one processor, cause the at least one processor to implement a committing tool comprising user interface logic and committing logic. The user interface logic is configured to generate display screens for presentation via a user device coupled to the computer system via a communication network. The committing logic cooperates with the user interface logic to generate display screens configured to receive user inputs from external user (seller)s to enter into a commitment to swap a specific commitment amount, comprising one or more loans, for a mortgage backed securities (MBS), and the guarantor commits to (i) receive delivery of loans meeting terms and conditions of the commitment, and (iv) receive a guarantee fee, guaranty fee buy up buy down fee, and/or loan-level price adjustments for insuring the credit risk on the group of delivered loans and guaranteeing to an investor the timely payment of principal and interest from the mortgages underlying the MBS.

BRIEF DESCRIPTION OF THE DRAWINGS

FIG. 2 is a screen display generated by a pricing administration tool in which an internal user may configure eligibility terms and conditions for MBS commitments for an external user (seller), according to an example embodiment.

FIG. 3 is a screen display generated by a pricing administration tool in which an internal user may configure guarantee fee pricing for a seller, according to an example embodiment.

FIG. 4 is a partial screen display of FIG. 2 that shows an expanded view of seller commitment terms.

FIG. 5 is a screen display generated by a commitment tool in which an external user (seller) or internal user may enter commitment amounts and other information to propose a commitment, according to an example embodiment.

FIG. 6 is a screen display generated by a commitment tool in which an external user (seller) or internal user may browse offered prices, according to an example embodiment.

FIG. 7 is a screen display generated by a commitment tool in which an external user (seller) or internal user may make a commitment, according to an example embodiment.

FIG. 8 is a screen display generated by a commitment tool in which an internal user may set and view system settings, according to an example embodiment.

FIG. 9 is a screen display generated by a commitment tool in which an external user (seller) or internal user may initiate a roll transaction, according to an example embodiment.

FIGS. 11A-11C are a series of screen displays generated by a commitment tool in which an external user (seller) or internal user may perform a pair-off transaction, according to an example embodiment.

FIG. 12 is a screen display generated by a commitment tool in which an external user (seller) or internal user may view a summary of commitment-related transactions, according to an example embodiment.

FIG. 13 is a screen display generated by a commitment tool in which an external user (seller) or internal user may view commitment details, including related commitment activity.

FIG. 14 is a screen display generated by a commitment tool in which an external user (seller) or internal user may view multiple open commitments FIG. 15 is a screen display generated by a commitment tool in which an external user (seller) or internal user may view multiple closed commitments.

FIG. 16 is a screen display in the commitment tool in which an external user (seller) or internal user may view, add, change or delete email notifications.

Figure 17B:
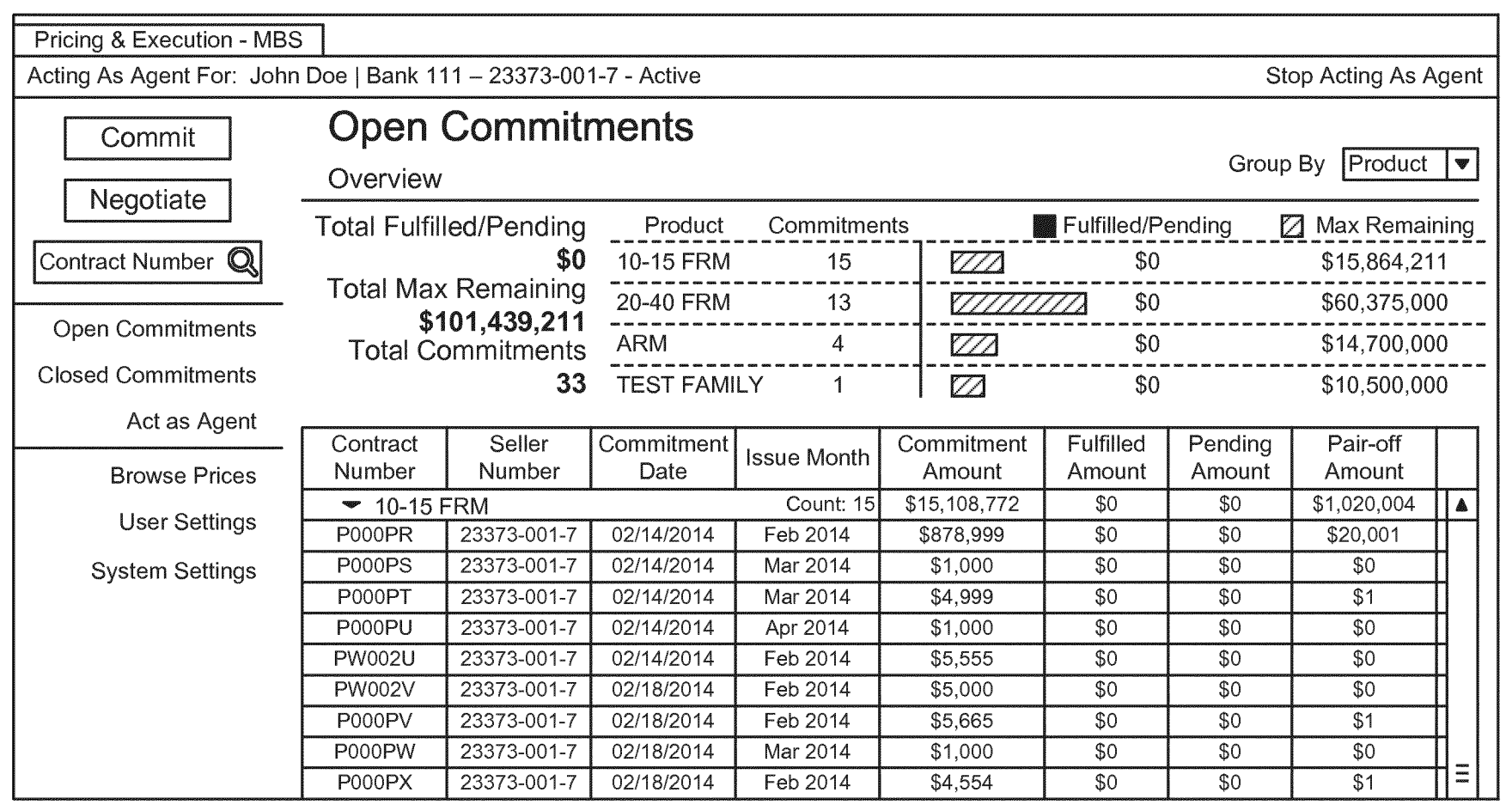

FIGS. 17A-17C are a series of screen displays generated by a commitment tool in which an internal user may make commitments, perform roll or pair-off transactions on behalf of an external user (seller).

FIG. 18 is a screen display generated by a commitment tool in which an internal user may make a negotiated commitment with an external user (seller).

FIG. 19 is a screen display generated by a pricing administration tool in which an internal user may approve changes to pricing and commitment terms.

FIG. 20 is a screen display generated by a pricing administration tool in which an internal user may create and modify products, using a defined list of attributes.

FIG. 21 is an example of the email confirmation that an internal user or external user can set up to notify the user or other users of commitments, rolls or pair-off transactions.

Figure 1:
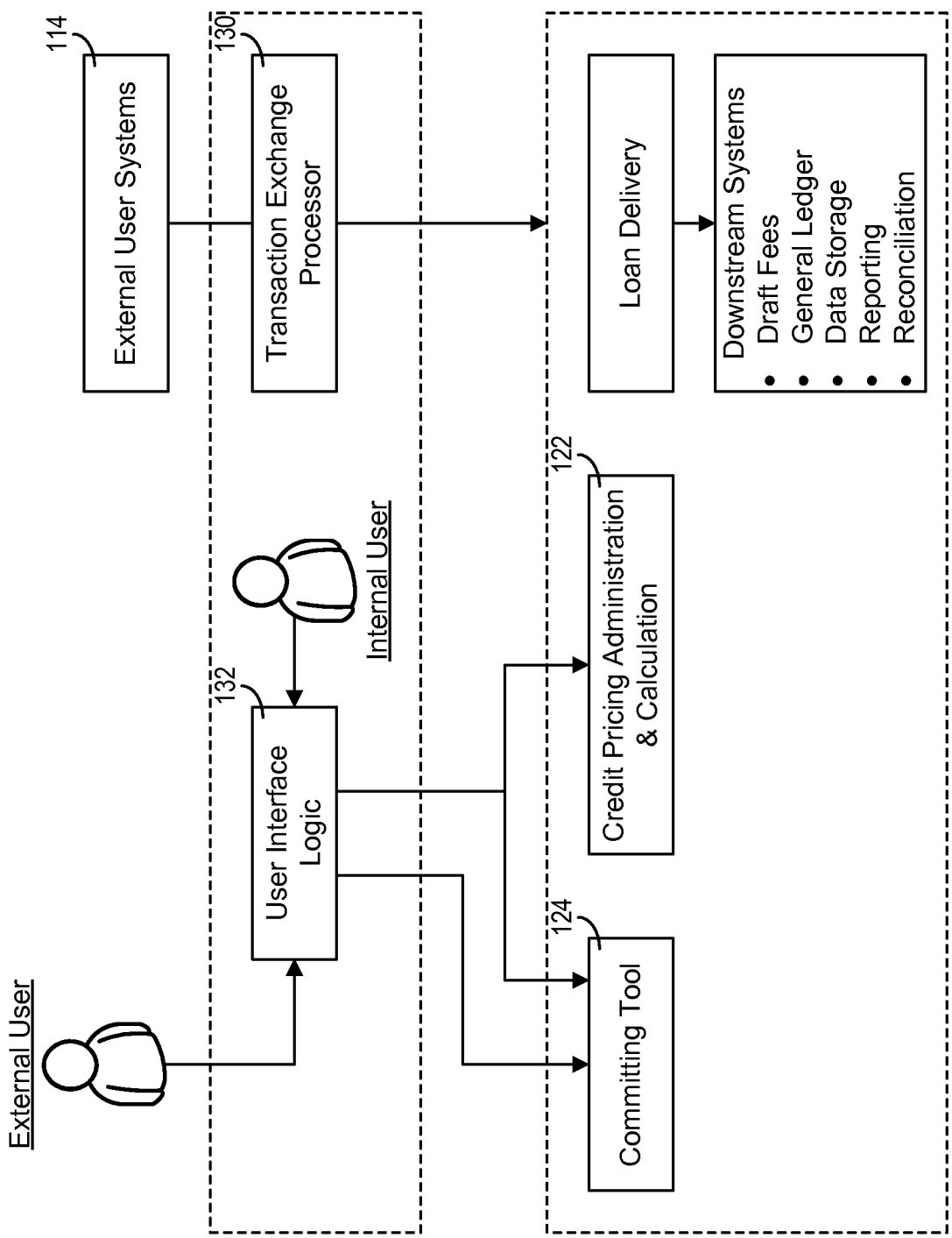
FIG. 1 is a block diagram of computer architecture for implementing the systems and methods of the present disclosure, according to an example embodiment.

Each email contains a link to the commitment details that the email recipient can view, if they have access to the committing tool.

DETAILED DESCRIPTION

According to example embodiments, computer systems are used to facilitate the sale of mortgages into the secondary market. For example, computer systems are used to perform credit guarantee pricing administration and calculation, including the administration of credit guaranty pricing for mortgage loans offered by the credit guarantor to the mortgage loan seller, such as guarantee fees, guaranty fee buyup/buydowns, and loan level price adjustments. Computer systems are also used to execute agreements between the mortgage loan seller and the credit guarantor for the credit guarantor to receive a fee in exchange for insuring the credit risk on the group of delivered mortgage loans and guaranteeing to an investor the timely payment of principal and interest from the mortgage loans underlying the MBS. Computer systems are used to calculate the credit guaranty price for a delivered mortgage loan based on the agreement made between the mortgage loan seller and the credit guarantor.

According to example embodiments, the computer systems comprise a pricing administration and calculation tool and committing tool that may be used to implement a commitment-based credit pricing arrangement in connection with mortgage backed securities. The commitment-based credit pricing arrangement may allow credit pricing changes to be implemented more quickly than, for example, a contract-based credit pricing arrangement in which pricing is negotiated and agreed upon. The pricing administration and calculation tool includes a user interface that may be accessible to internal users at a guarantor of a mortgage loans. The pricing administration tool may be used to make changes to various types of credit pricing, such as guarantee fees, loan level price adjustments and guarantee fee buyups and buydowns. After changes are implemented via the pricing administration tool, subsequent commitments made by sellers using the committing tool reflect the pricing updates. The external user (seller) initiates MBS commitments via the committing tool. The internal user at a guarantor can also initiate commitments on behalf of the seller. When the internal/external user accepts pricing via the committing tool, a legally binding contract is created that reflects the credit pricing and all terms of the MBS commitment. According to various example embodiments, the changes may be made on a seller-by-seller, mortgage product-by-product, issue month-by-issue month, and coupon-by-coupon basis.

The pricing administration and calculation tool also includes an approval administration function that enables internal users to assign approval rights to other internal users, submit changes to pricing, seller commitment terms, or product terms for approval by an internal approver, submit items for approval based on a specific effective date or an immediate effective date, and approve credit pricing, seller commitment terms and product terms. The pricing administration and calculation tool also includes logic to validate delivered loans against loan commitment terms and assign the loan-specific credit price to the loan based on the pricing terms in the seller's loan commitment.

The committing logic cooperates with the user interface logic to generate display screens configured to receive user inputs from external user (seller) to enter into mortgage backed security (MBS) commitments. Pursuant to the MBS commitments, the external user (seller) commits to deliver a specified dollar value of mortgage loans, in exchange for mortgage backed securities, comprised of certain product(s) in a specified issue month. The committing logic also generates display screens that enable users to view and download offered credit guarantee pricing and the applicable products, before executing MBS commitments and display screens that enable users to view and download MBS commitment data independently or in groups of commitments and manipulate into various filtered formats. The committing logic enables users to reduce the commitment amount (pair-off) or move an amount to the next issue month (roll), enables new commitments, pair-offs and rolls be executed by an internal user on behalf of a seller, using same functionality and seller terms, and enables an internal user to execute a negotiated commitment with a seller, for terms that are not normally included in the seller's current commitment profile.

Referring now to FIG. 1, a computer system 110 for processing data pertaining to financial assets is shown. As shown in FIG. 1, the system 110 comprises a data processing system 112, user systems 114. The data processing system 112 further comprises transaction exchange processor 130, user interface logic 132, and data storage system 134.

The data processing system 112 is configured for processing data pertaining to financial assets, such as loans and securities. In one embodiment, the data processing system 112 is configured to be used by a participant in the secondary mortgage market. Herein, for convenience, the participant is referred to as a "guarantor," although it should be understood that the guarantor may participate in the secondary market in other, different, or additional ways (e.g., as a loan purchaser, etc.).

The pricing and execution logic 120 is preferably usable to perform such operations as receiving information such as loan term, interest rate, principal owed and other loan-related parameters when the loans are delivered and entered into the data processing system 112. The pricing and execution logic 120 is also used to perform such operations as managing certain credit pricing, commitments and receiving commitments. The pricing and execution logic 120 includes pricing administration and calculation logic 122 and committing tool logic 124.

The pricing administration and calculation logic 122 may also be configured to permit internal users to configure credit pricing, set up sellers/seller terms for commitment, configure products that are assigned to external user (seller), to enable them to make commitments, using committing tool logic 124, and so on. Internal users may maintain information regarding the eligibility of particular sellers to deliver particular products and to the guarantor. Operation of the pricing administration and calculation logic 122 in this regard is described in greater detail below in connection with FIGS. 2-4, 19 and 20.

Further, in various embodiments, the committing tool logic 124 may interact with other logic in the data processing system 112 to generate and provide pricing information in other contexts. For example, when an external user (seller) is unable to fulfill the terms of its commitment, fees may be assessed to the external user (seller). Delivery and tolerance information may be acquired from the pricing administration and calculation logic 122 and used to determine whether commitments are fulfilled.

The committing logic 124 provides a committing tool for external user (seller) to enter into commitments such as MBS commitments. An MBS commitment is an agreement in which an external user (seller) agrees to deliver a specified dollar value of mortgage loans, and the guarantor (i) receives delivery of loans, and (iv) receives a fee ("guarantee fee" or "gfee") for guaranteeing to an investor the timely payment of principal and interest from the mortgages underlying the MBS. Typically, a commitment specifies the type of mortgage(s) the external user (seller) plans to deliver, dollar value of the mortgage(s) the external user (seller) plans to deliver, the amount of time the external user (seller) has to make delivery, a guarantee fee the guarantor will charge the external user (seller) for the loan(s), other pertinent loan terms, and, in some cases, loan level details pertaining to the mortgage. (It may be noted that, herein, the terms "product," "mortgage," and "mortgage product" are used synonymously.) Operation of the committing tool logic 124 in this regard is described in greater detail below in connection with FIGS. 5-18 and 21.

The transaction exchange processor 130 provides a bulk data transfer mechanism for exchanging at least some of the transaction-related data mentioned above in connection with the external user systems 114, typically without intervention of a human operator. Such bulk data transfers may occur with sellers, servicers, and so on. Other data interfaces (e.g., configured to receive information from third party data sources) may also be included.

The user interface logic 132 provides entry to the user systems 114, e.g., via a secure internet connection. The user interface logic 132 provides a user interface to the data processing system 112. For example, the user interface logic 132 may be configured to dynamically generate web pages for presentation to users via the user systems 114. The user may then perform functions in accordance with what is permitted by the user's authorization profile (which, in turn, is typically based on the user's employer and the user's job function for that employer). The user interface logic 132 may cooperate with the pricing administration and calculation logic 122 and the committing tool logic 124 to provide a pricing administration tool and a committing tool, as described in greater detail below in connection with FIGS. 2-4, 19 and 20 and FIGS. 5-18 and 21, respectively. For example, using the pricing administration tool, internal users may specify guarantee fee values for specific sellers, enter terms and conditions for commitments, and configure eligibility of specific sellers to enter into commitments with respect to specific types of products, and so on. Using the committing tool, an employee or agent of a seller may be given authorization to access web pages associated with the acquisition logic 120 and to enter into MBS commitments.

Referring now to FIGS. 2-4, 19 and 20, screen displays that may be generated via user interface logic 132 are shown. The screen displays may be generated in connection with a pricing administration tool that is implemented by pricing administration and calculation logic 122 operating in combination with user interface logic 132. In various embodiments, the price administration tool is only accessible to the guarantor and is not accessible to external user (seller). For example, the pricing administration tool may be accessible to internal users associated with/employed by the guarantor. The pricing administration tool may configured to provide various functionality to internal users, such as the ability to specify guarantee fee values or other credit pricing (e.g. LLPAs, BUBD) for specific sellers, enter seller terms and conditions for commitments, create and assign products for one or more sellers, and so on.

For example, the pricing administration tool may be used to set guarantee fee pricing. Pricing may be set on a seller-by-seller basis, product-by-product, issue month-by-issue month, and coupon-by-coupon basis. In various embodiments, the pricing administration tool may also be configured to permit an internal user to set loan level price adjustments, other credit pricing fees and other MBS commitment terms at the seller and product levels.

Additionally, the pricing administration tool may also be configured to set up commitment terms for the external user (seller), or change commitment level terms such as assigned products, and other terms associated with MBS commitment(s) subsequently taken. Specifically, internal users may maintain information regarding the eligibility of particular sellers to deliver particular products to the guarantor.

Further, the pricing administration tool may also be configured to permit internal users to configure the products that are made available to external users (sellers) that may commit to deliver using committing logic 124. Once a seller is configured with products, the committing logic 124 may then limit commitment activity to only those products that the seller is eligible to sell. During the committing process, the external user (seller) may select the type of product(s) the external user (seller) plans to deliver from a list of eligible products.

Figure 3:
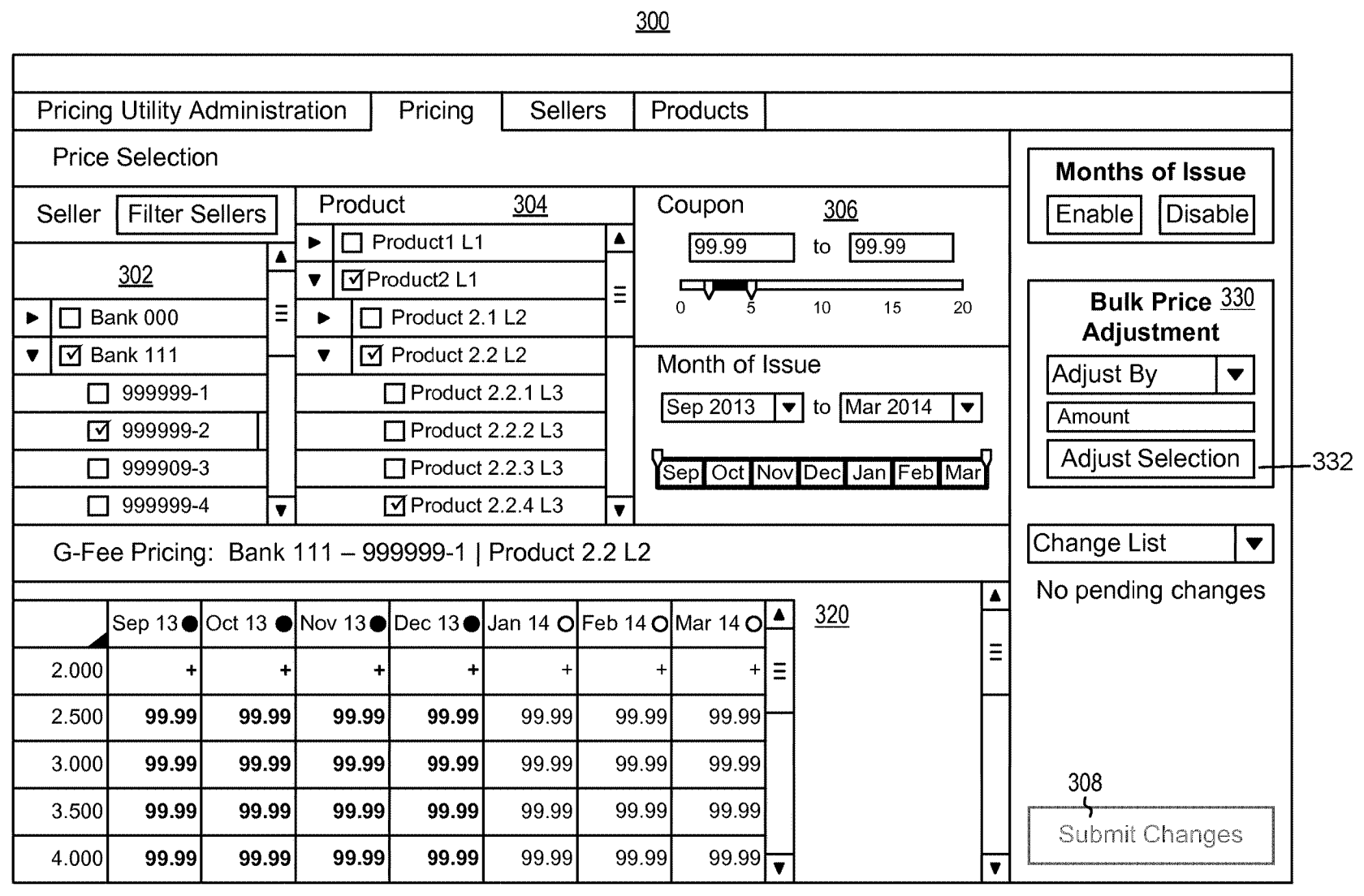
Figure 20:
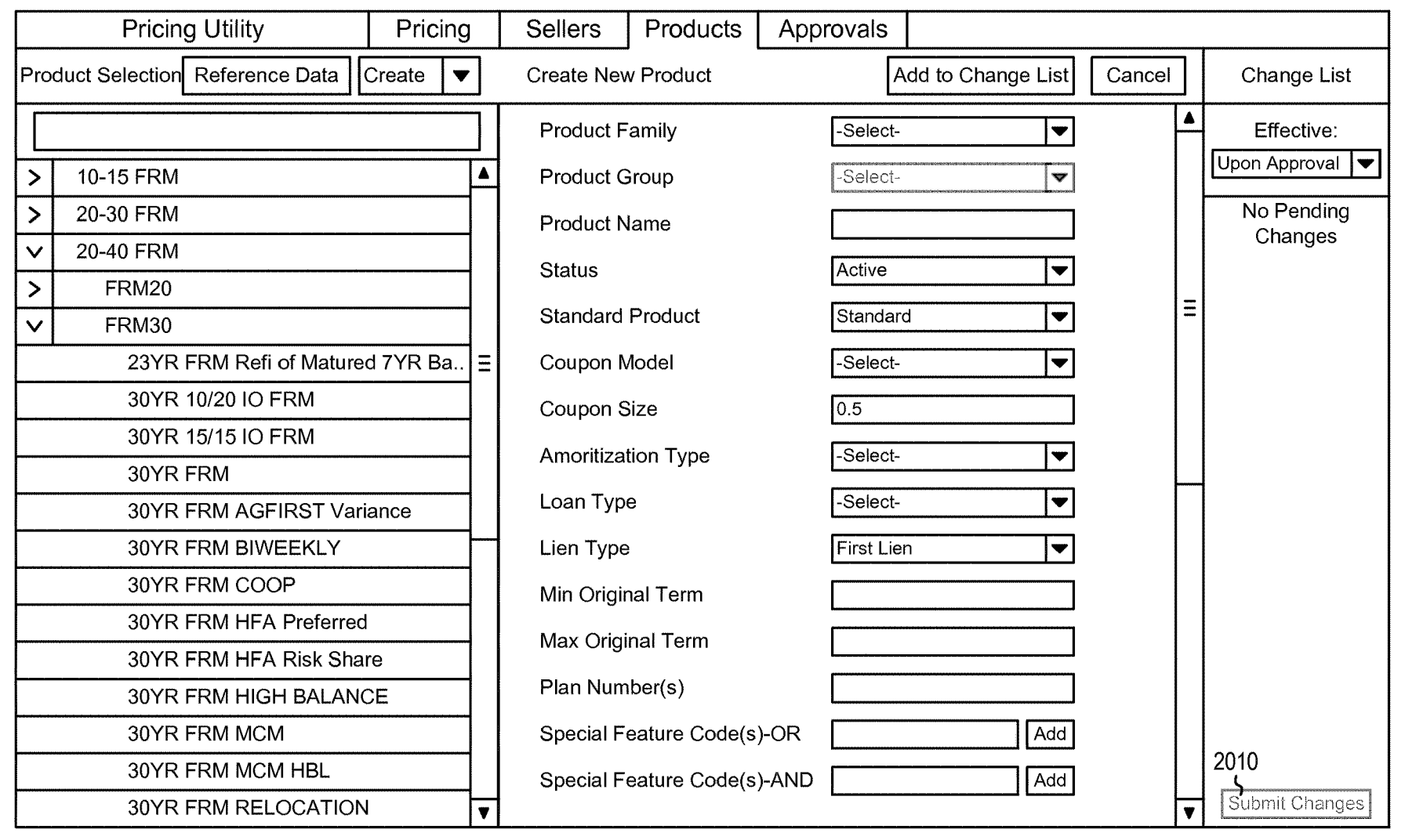

There is an approval workflow construct in pricing administration that can render submitted pricing/seller/product changes/updates effective, subject to a delegated approval hierarchy. The changes can become effective substantially immediately (e.g., within minutes or seconds) or upon a designated effective date. The internal user enters the changes to be submitted for approval in the Pricing screen (FIG. 2), Seller screen (FIG. 3) or Product screen (FIG. 20), then submits the change(s) for approval by pressing the "Submit Changes" button (FIG. 2, 230; FIG. 3, 308; FIG. 20, (2010)) and the change request is disclosed to the delegated approver on the Approvals screen (FIG. 19) to "Accept" or "Reject" the changes submitted. Thereafter, the committing tool will reflect the changes/updates made by the internal user. To approve external user (seller) changes, the approval structure requires a match of the same (or higher) approval level for internal user. Certain changes cannot be approved by the same internal user that made the changes.

Referring first to FIG. 2, FIG. 2 shows a display screen 200 that may be provided as part of the pricing administration logic 122. In the display screen 200, the user has selected a tab 201 ("sellers"). In this portion of the pricing administration tool, the user has the ability to set up and configure different sellers to use the committing tool, as described in greater detail below in connection with FIGS. 5-18 and 21. Field 202 shows a list of different sellers. Within each seller, different seller branches may be configured (e.g., different branches that have the ability to enter into commitments on behalf of the external user (seller)). The different branches for a seller (field 204) are shown in field 206. By selecting an edit button 208, the user has the ability to edit various settings for a selected branch within a seller, such as shown in fields 210 and 212. Field 212 shows various mortgage products that the external user (seller) is eligible to commit. Field 210 shows various information about the seller that is not configurable/editable (e.g., seller name, seller status, eligibility to make MBS commitments, and so on). When scroll bar 214 is moved, the seller-specific commitment attributes shown in FIG. 4 may be selected or changed to set forth the terms and conditions of a future MBS commitment, when the external user (seller) enters into such a commitment. MBS commitments that the seller has already taken, are not impacted by these changes.

In one embodiment, each seller ID or branch may be associated with a specific external user. In other embodiments, multiple seller IDs or branches may be given to the same external user (e.g., if the person has the authority to enter into commitments on behalf of multiple sub-entities of an enterprise organization). In other various embodiments, various users may be given various levels of access to multiple seller IDs or branch (e.g., to implement various user roles under each seller ID or branch). For example, a seller ID or branch may have one user that has authority to enter into commitments using the seller ID or branch, but may have multiple additional users that have authority to view commitments that have been entered into under that seller ID or branch.

FIG. 2 also shows how a seller may be configured by the internal user to enter into commitments for multiple products. In FIG. 2, product family 216 (Product 4 L1) comprises product group 218 (Product 4.1 L2) and product group 220 (Product 5 L1). Product group 218 further comprise product 222 (Product 4.1.1 L3). Product group 220 further comprises products 224 (Product 5.1 L2, Product 5.2 L2). Hence, if the seller is configured to enter into commitments at the product level, the external user (seller) may only enter into a commitment for specific products (e.g., Product 5.1 L2), and all the mortgages delivered under that commitment would be the same product (e.g., Product 5.1 L2). If the seller is configured at the product group level, the external user (seller) may enter into commitments for products within the same product group. For example, the external user (seller) may enter into a commitment for product group 218 (Product 4.1 L2), and the external user (seller) may deliver Product 4.1 L2 mortgages into that commitment. (In various embodiments, for a seller that is assigned to multiple groups, a commitment may be made to one group, i.e., the seller is not permitted to enter into one commitment that may be fulfilled with mortgages from different groups.) If the seller is configured at the product family level, the external user (seller) may enter into commitments for products within the same product family. For example, the external user (seller) may enter into a commitment for product family 216, comprising product 222 (Product 4.1.1 L3), products 224 (Product 5.1 L2 and Product 5.2 L2) and the external user (seller) may deliver any of those products under that commitment. (In various embodiments, for a seller that is assigned to multiple families, a commitment may be made to one family, i.e., the seller is not permitted to enter into one commitment that may be fulfilled with mortgages from different families.) In the example shown in FIG. 2, the seller is configured at the product group level, as indicated by in field 226.

Referring now to FIG. 3, in FIG. 3, the user has selected tab 301 ("pricing"). In this portion of the tool, the user has the ability to set guarantee fee pricing. As previously noted, the user has the ability to set pricing on a seller-by-seller basis (selected in field 302), on a product-by-product basis (selected in field 304), issue month-by-issue month, and on a coupon-by-MBS coupon basis (selected in field 306). In the illustrated example, as shown in grid 320, the user has selected and is setting, via grid 320, guarantee fee pricing for Product 2.2.4 L3 delivered by a hypothetical external user (seller) (named "Bank111", branch #"999999-2") having a coupon in the range of 99.99 to 99.99.

Pricing may be changed in various ways by the internal user: Individual cell entry; highlighting a range of cells in grid 320; highlighting a row or column entry in grid 320; highlighting the entire grid 320, then making a "Bulk Price Adjustment" via the adjust selection button 332 in the bulk price adjustment control container 330 (for example, using a value or adjusting an existing price by a "+/−" amount or by deleting one or more value(s) in the grid 320). The internal user may also select a range of Issue Months for which pricing is applicable (or not) across one of more coupons. Once all pricing changes have been made, the internal user may submit the pricing changes for approval by selecting the "Submit Changes" button (308).

Referring now to FIG. 4, additional terms and conditions of the MBS commitment may be set forth by the internal user using the pricing administration and calculation logic 122. FIG. 4 is an expansion of field 210 in FIG. 2, which shows such terms and conditions. For example, the user may move scroll bar 214 in FIG. 2 in order to view/edit other terms and conditions as shown in FIG. 4. In some embodiments, some of the attributes shown in FIG. 4 may be configured by the internal user, while other attributes shown in FIG. 4 may be determined based on data feeds from other sources.

Referring now to FIGS. 5-18 and 21, FIGS. 5-18 and 21 show additional committing tool screen displays that may be generated user interface logic 132. The screen displays may be generated in connection with a committing tool that is implemented by committing logic 124 operating in combination with user interface logic 132. Once a seller has been set up in the pricing administration tool (and once they have filed any required documents to ensure that they can perform MBS committing with the guarantor and can access the committing tool), then the external user (seller) can log into the commitment tool and make commitments. The committing tool provides functionality for external user (seller) to perform all MBS commitment functions. These functions may include, for example, making MBS commitments, browsing credit price, pair-off commitments, extending commitments (i.e., rolls), updating contact information, viewing/emailing commitments, fees, prices, and so on. Hence, in various embodiments, there is no paper/hardcopy commitment contract apart from the contract created via the committing tool. The terms of the contract are those specified by the pricing administration tool and the committing tool and viewable to the external user (seller) via the committing tool. Once the commitment is executed, the external user (seller) is given a system-generated contract number into which the external user (seller) may then deliver loans to swap for mortgage backed securities.

Referring now to FIG. 6, FIG. 6 shows a browse pricing display screen 600 that may be presented to the external user (seller). As will be appreciated, the pricing shown in FIG. 6 may be updated at essentially any time. That is, the pricing may be updated at a frequency of greater than once per quarter, greater than once per month, greater than once per week, or even greater than once per day, according to the business judgment of the guarantor. In yet other embodiments, the pricing shown in FIG. 6 may be dynamically updated. As soon as any pricing changes are made, via the pricing administration tool, and approved by the guarantor, such pricing updates are reflected in the committing tool, and any subsequent commitments entered into by the external user (seller) reflect the updated pricing. Hence, pricing changes may be implemented within a matter of minutes or less.

After viewing the available pricing, the external user (seller) may decide to enter into a commitment. If the external user (seller) decides to enter into a commitment, the external user (seller) may press button 610 ("Commit"). When the external user (seller) presses button 610, the external user (seller) is delivered to display screen 500, shown in FIG. 5.

Referring now to FIG. 5, when an external user (seller) wishes to enter into a commitment, a screen display 500 may be shown to the external user (seller). The screen display 500 includes a field 502 to receive a commitment amount and a field 504 to select a month of issue from an available list of issue months, as made eligible to the seller via the pricing administration tool. Product parameters of the commitment are shown in field 506 and 508. Specifically, fields 506 and 508 show product parameters of mortgages that the external user (seller) is committing to deliver under the commitment.

After the external user (seller) has reviewed the terms of the commitment as set forth in fields 502, 504, 506 and 508, the external user (seller) may press button 510 ("Get Pricing"). When the external user (seller) presses button 510, the external user (seller) is delivered to display screen 700, shown in FIG. 7.

Referring now to FIG. 7, FIG. 7 shows pricing for the commitment shown in FIG. 5 as well as other details of the commitment. Specifically, in FIG. 7, a table 705 is shown that shows guarantee fee pricing for different mortgages having different coupon ranges. If the external user (seller) enters into the commitment, the external user (seller) can deliver mortgages in a variety of different ways so long as the mortgages fit the terms of the commitment as set forth in FIG. 7.

For example, with regard to field 710, the external user (seller) can deliver all FHA mortgages, all VA mortgages, or a combination of both. Likewise, the external user (seller) can deliver mortgages that all have a coupon of 2.000, mortgages that all have a coupon of 4.500, or some combination of mortgages having coupons ranging from 2.000 to 4.500. The external user (seller) can also deliver a pool of mortgages having a coupon of 2.000 and a separate pool of mortgages having a coupon of 4.500 in fulfillment of the same commitment.

Field 712 shows an amount of time remaining that the external user (seller) has to enter into the commitment. If the external user (seller) decides to enter into the commitment, the external user (seller) may enter a password into field 714 and press button 716 ("Accept"), thereby creating a binding commitment contract. The external user (seller) thereby agrees to the pricing shown in table 705, which potentially may have been updated only minutes or seconds before. Hence, the external user (seller) agrees to the guarantee fee pricing, general commitment terms and product-specific terms at the time of the commitment, not in advance (e.g., via a separate negotiation/paper-based contract). If the external user (seller) decides not to enter into the commitment, the external user (seller) may press button 720 ("Reject") or simply allow time to expire. Once the external user (seller) accepts the MBS commitment using the committing logic 124, the terms and conditions of the MBS pool contract are those set forth by the internal user using the pricing administration logic 122 and as specified in FIGS. 5-7. The commitment is then memorialized with a system-generated contract number that the external user (seller) will later use to manage the commitment details, e.g. roll (FIG. 9-10), pair-off (FIG. 11), or deliver loans to fulfill the commitment. Subsequently, a system-generated email confirmation (FIG. 21) is sent to the external user (seller) and any other users on the user's email distribution. The external user (seller) may set up or modify the email distribution list at any time.

Once the commitment has been executed, the committing tool becomes the system of record for the commitment. The committing tool is the system of record for all commitments executed by the external user (seller). Details for each commitment may be found by clicking on the contract number hyperlink which then provides each commitment's details, using the Open Commitments screen or the Closed Commitments screen.

Open Commitments screen contains all outstanding commitments. The external user (seller) may click on the link for each contract number associated with a commitment to obtain the details of the commitment. The commitment details are those described earlier in FIG. 7 and FIG. 13, along with additional details about fulfillment of the commitment (fees, rolls, pair-offs, partial rolls, partial pair-off, activity log).

Closed Commitments screen contains all fulfilled or paired off commitments. The external user (seller) may click on the link for each contract number associated with a commitment to obtain the details of the commitment. The commitment details are those described earlier in FIG. 7 and FIG. 13.

FIG. 8 shows a display screen 800 that may present other system settings to the internal users.

Referring now to FIG. 9, FIG. 9 shows a display screen 900 that may be presented to the external user (seller) when the external user (seller) elects to roll a portion of a commitment. After a commitment is initially executed, the external user (seller) may subsequently decide to roll all or part of the outstanding balance (910) of the commitment to the next issue month. Field 912 provides a location for the external user (seller) to enter a roll amount. Check box 914 enables the user to select the entire outstanding balance of the commitment as the roll amount, if needed. Field 916 specifies a new month of issue. Field 920 provides a summary of the proposed roll transaction. Specifically, the external user (seller) has proposed rolling all of the outstanding balance to the new month of issue (November 2013). The user may now select Calculate Fee or Cancel button. If Calculate Fee (917) is selected, the proposed commitment appears with the roll details.

Figure 10:
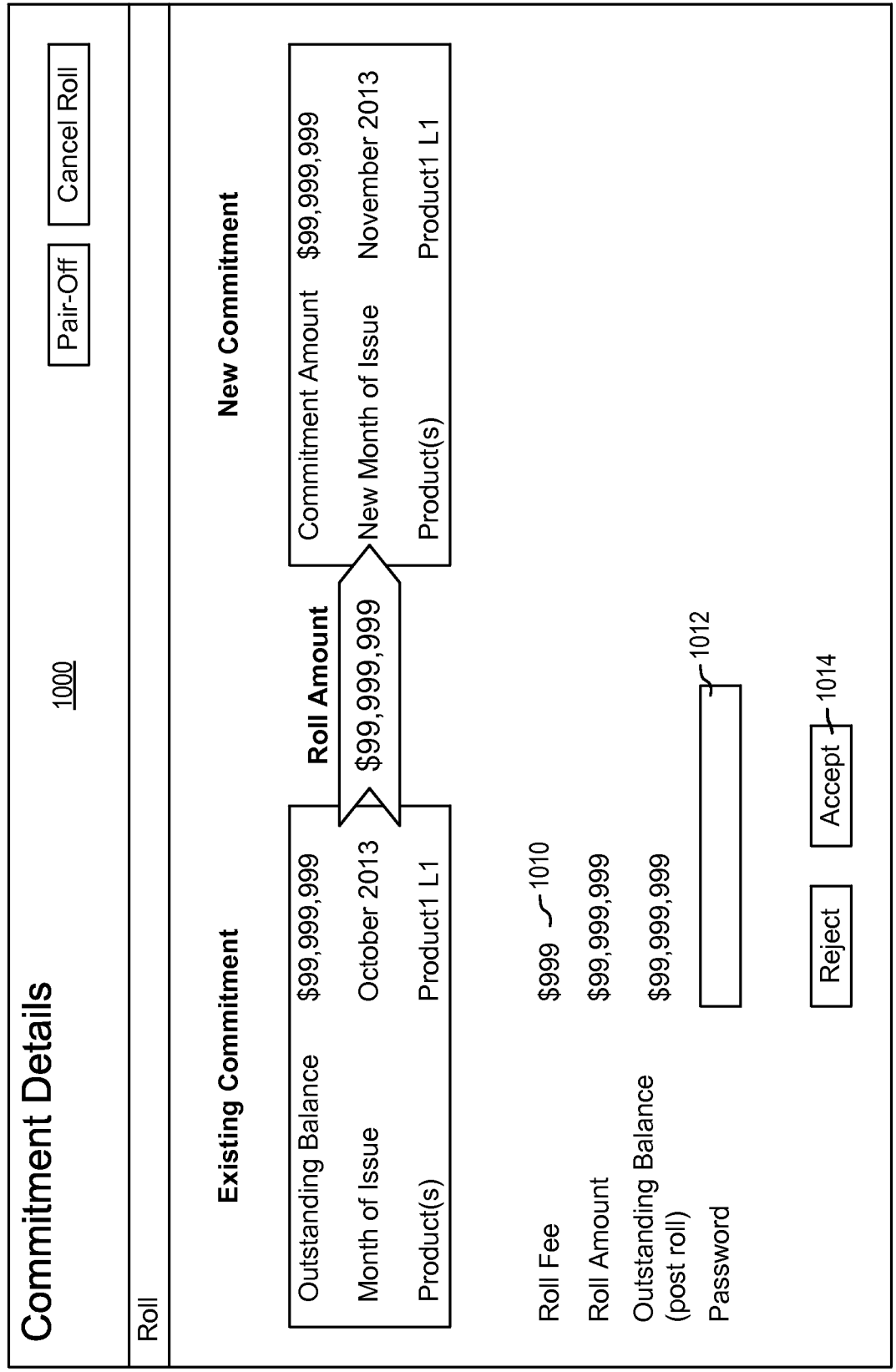
FIG. 10 is a screen display generated by a commitment tool in which an external user (seller) or internal user may complete a roll transaction, according to an example embodiment.
Figure 17A:
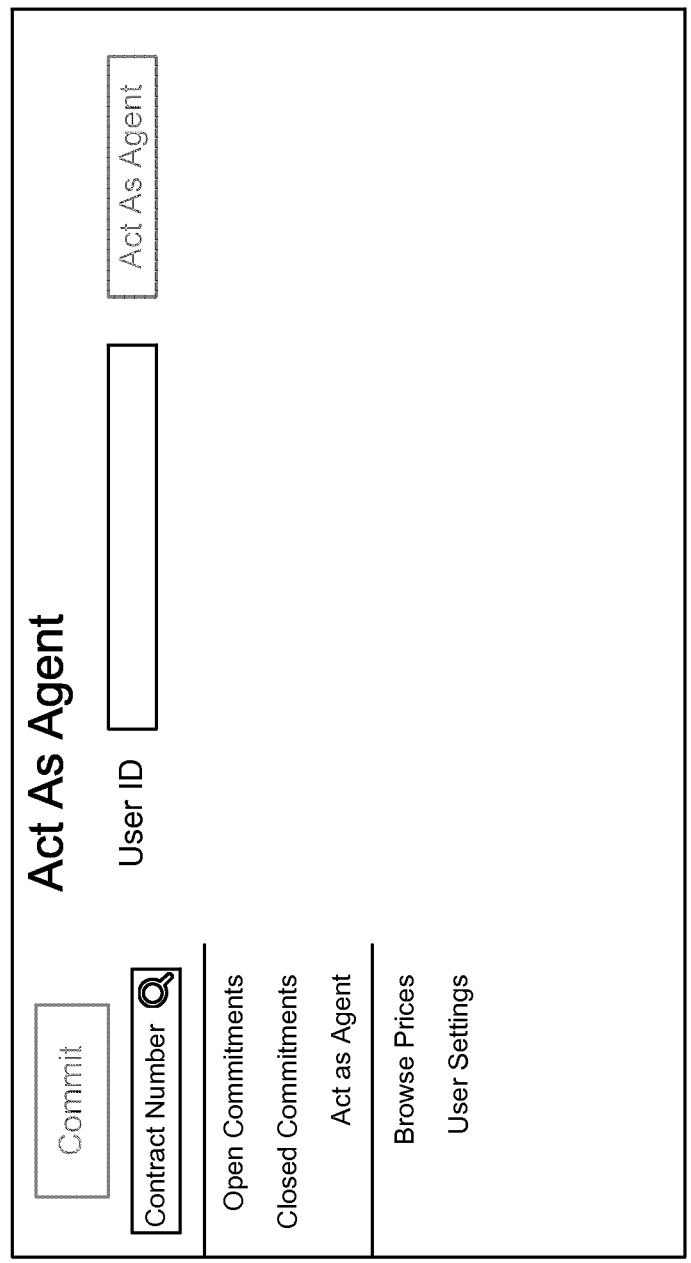

Referring now to FIG. 10, FIG. 10 shows a display screen 1000 in connection with a proposed roll transaction, that may be presented to the user after the user presses button 917 in FIG. 9. A roll transaction enables the external user (seller) to extend all or part of a commitment to the next issue month. A fee may or may not be charged for a roll transaction. As shown in FIG. 10, at field 1010, a roll fee of $999 is displayed to the user. The roll fee is calculated based on the roll fee factor (bps) shown in FIG. 4 and the roll amount (i.e., roll amount×roll fee factor (bps)=$999). To execute the roll commitment transaction, the user types in password (1012) and selects ACCEPT (1014). By entering a password in field 1012 and pressing the Accept button 1014, the external user (seller) can complete the roll transaction.

Referring now to FIGS. 11A-11C, FIGS. 11A-11C show a series of display screens 1100 in connection with a pair-off transaction. A pair-off transaction is a reduction of all or part of any outstanding commitment volume. A fee may or may not be charged for a pair-off transaction. Functionally, pair-offs may be handled in a generally similar manner as roll transactions. In FIGS. 11A-11C, the external user (seller) has opted to pair-off half of the outstanding commitment. The pair-off fee is calculated based on the pair-off fee factor (bps) shown in Fig. # and the pair-off amount (i.e., pair-off amount×pair-off fee factor (bps)=$$$$). To execute the pair-off transaction, the external user (seller) types in password and selects ACCEPT. By entering a password and pressing the Accept button, the external user (seller) completes the pair-off transaction. A pairoff commitment fulfills the original commitment for the pairoff amount.

FIG. 12 shows a display screen 1200 that may be presented to the external user (seller) summarizing the commitment activity that has occurred for the contract, date and time stamps, user ID, commitment type, commitment amount, and any associated fees that have revised the original commitment details.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings. The present embodiments contemplate methods, systems and program products on any machine-readable media for accomplishing its operations. The embodiments of may be implemented using an existing computer processor, or by a special purpose computer processor incorporated for this or another purpose or by a hardwired system.

As noted above, embodiments within the scope of this disclosure include program products comprising non-transitory machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments have been described in the general context of method steps which may be implemented in one embodiment by a program product including machine-executable instructions, such as program code, for example in the form of program modules executed by machines in networked environments. Generally, program modules include routines, programs, objects, components, data structures, etc. that performs particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the embodiments might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A computer system comprising: at least one processor and non-transitory computer readable media having instructions stored therein that, when executed by the at least one processor, cause the at least one processor to implement a seller-side committing system structured to synchronize pricing with a guarantor-side price administration system, comprising operations to:
generate, by a committing logic cooperating with a user interface logic, via at least one of a guarantor-side computing device and a seller-side computing device, display screens configured to receive user inputs from sellers to enter into a commitment to swap a specific commitment amount, comprising one or more loans, for a mortgage backed securities (MBS), wherein a guarantor commits to (i) receive delivery of loans meeting terms and conditions of the commitment, and (ii) receive a guarantee fee, guaranty fee buy up buy down tee, and/or loan-level price adjustments for insuring credit risk on a group of delivered loans and guaranteeing to an investor timely payment of principal and interest from mortgages underlying the MBS, comprising operations to:
generate, by the user interface logic, and display on the guarantor-side computing device a first guarantor-side electronic form comprising an expandable grid, the expandable grid comprising editable guarantee fee pricing data, the first guarantor-side electronic form structured to:
in response to detecting a first guarantor-side user interaction via the guarantor-side computing device, identify at least two user-highlighted cells in the expandable grid; and
in a single electronic submission, change at least two fee pricing data points according to values in the at least two user-highlighted cells;
generate, by the user interface logic, and display on the guarantor-side computing device a second guarantor-side electronic form comprising system settings, the system settings comprising a timeout value;
in response to detecting a second guarantor-side user interaction via the guarantor-side computing device, the second guarantor-side user interaction comprising a change to the timeout value in the system settings, set the timeout value to a user-entered value; and
cause the seller-side committing system to:
in response to detecting a first seller-side user interaction via a seller-side computing device, generate a seller-side display screen on the seller-side computing device, the seller-side display screen comprising dynamically updated fee pricing data points corresponding to the at least two fee pricing data points changed via the guarantor-side computing device, the seller-side display screen further comprising a timer comprising a time remaining to accept, the time remaining to accept set based on the timeout value supplied via the guarantor-side computing device; and
in response to detecting a second seller-side user interaction via the seller-side computing device, determine that the timer has not expired; and
based on a determination that the timer has not expired, generate a new MBS commitment based on the updated fee pricing data points.

2. The computer system of claim 1, wherein the display screens are further configured to receive information specifying a pair-off transaction in which an amount of an outstanding commitment is reduced.

3. The computer system of claim 1, wherein the display screens are further configured to receive information specifying a roll transaction in which an amount of an outstanding commitment is rolled from a first delivery deadline to a second delivery deadline.

4. The computer system of claim 1, wherein the display screens are further configured to display and download information pertaining to a commitment previously taken.

5. The computer system of claim 1, wherein the display screens are further configured to receive information specifying a new commitment, pair-off or roll from an internal user acting on behalf of a seller.

6. The computer system of claim 1, wherein the display screens are further configured to receive information specifying an agreement to a negotiated commitment.

7. The computer system of claim 1, wherein the display screens enable users to view and download offered credit guarantee pricing and applicable products before executing MBS commitments.

8. The computer system of claim 1, wherein the display screens enable users to view and download MBS commitment data independently or in groups of commitments and manipulate into various filtered formats.

9. The computer system of claim 1, wherein the committing logic enables users to reduce a commitment amount (pair-off) or move an amount to a next issue month.

10. The computer system of claim 1, wherein the committing logic enables new commitments, pair-offs and rolls be executed by an internal user on behalf of a seller, using same functionality and seller terms.

11. The computer system of claim 1, wherein the committing logic enables an internal user to execute a negotiated commitment with a seller for terms that are not normally included in a seller's current commitment profile.

12. The computer system of claim 1, wherein the first guarantor-side electronic form comprises contemporaneously viewable controls, the contemporaneously viewable controls comprising:
a first expandable data container configured to allow multiple sellers to be viewed simultaneously on the at least one of the display screens, and
a second expandable data container configured to allow multiple products for at least one of the multiple sellers to be viewed simultaneously on the at least one of the display screens.

13. A method for electronically synchronizing operations between a guarantor-side price administration system and a seller-side committing system, the method comprising:
generating, by a committing logic cooperating with a user interface logic, via at least one of a guarantor-side computing device and a seller-side computing device, display screens configured to receive user inputs from sellers to enter into a commitment to swap a specific commitment amount, comprising one or more loans, for a mortgage backed securities (MBS), wherein a guarantor commits to (i) receive delivery of loans meeting terms and conditions of the commitment, and (ii) receive a guarantee fee, guaranty fee buy up buy down fee, and/or loan-level price adjustments for insuring credit risk on a group of delivered loans and guaranteeing to an investor timely payment of principal and interest from mortgages underlying the MBS, comprising:
generating, by the user interface logic, and displaying on the guarantor-side computing device a first guarantor-side electronic form comprising an expandable grid, the expandable grid comprising editable guarantee fee pricing data, the first guarantor-side electronic form structured to perform operations comprising:
    in response to detecting a first guarantor-side user interaction via the guarantor-side computing device, identifying at least two user-highlighted cells in the expandable grid; and
    in a single electronic submission, changing at least two fee pricing data points according to values in the at least two user-highlighted cells;
generating, by the user interface logic, and displaying on the guarantor-side computing device a second guarantor-side electronic form comprising system settings, the system settings comprising a timeout value;
in response to detecting a second guarantor-side user interaction via the guarantor-side computing device, the second guarantor-side user interaction comprising a change to the timeout value in the system settings, setting the timeout value to a user-entered value; and
causing the seller-side committing system to:
    in response to detecting a first seller-side user interaction via a seller-side computing device, generating a seller-side display screen on the seller-side computing device, the seller-side display screen comprising dynamically updated fee pricing data points corresponding to the at least two fee pricing data points changed via the guarantor-side computing device, the seller-side display screen further comprising a timer comprising a time remaining to accept, the time remaining to accept set based on the timeout value supplied via the guarantor-side computing device; and
    in response to detecting a second seller-side user interaction via the seller-side computing device, determining that the timer has not expired; and
    based on a determination that the timer has not expired,
generating a new MBS commitment based on the updated fee pricing data points.

14. The method of claim 13, wherein the display screens are further configured to display and download information pertaining to a commitment previously taken.

15. The method of claim 13, wherein the display screens are further configured to receive information specifying a new commitment, pair-off or roll from an internal user acting on behalf of a seller.

16. The method of claim 13, wherein the first guarantor-side electronic form comprises contemporaneously viewable controls, the contemporaneously viewable controls comprising:
a first expandable data container configured to allow multiple sellers to be viewed simultaneously on the at least one of the display screens, and
a second expandable data container configured to allow multiple products for at least one of the multiple sellers to be viewed simultaneously on the at least one of the display screens.

17. A non-transitory computer-readable media comprising computer-executable instructions stored thereon that, when executed by a processor, cause the processor to perform operations for electronically synchronizing a guarantor-side price administration system and a seller-side committing system, the operations comprising:

generating, by a committing logic cooperating with a user interface logic, via at least one of a guarantor-side computing device and a seller-side computing device, display screens configured to receive user inputs from sellers to enter into a commitment to swap a specific commitment amount, comprising one or more loans, for a mortgage backed securities (MBS), wherein a guarantor commits to (i) receive delivery of loans meeting terms and conditions of the commitment, and (ii) receive a guarantee fee, guaranty fee buy up buy down fee, and/or loan-level price adjustments for insuring credit risk on a group of delivered loans and guaranteeing to an investor timely payment of principal and interest from mortgages underlying the MBS, comprising:
generating, by the user interface logic, and displaying on the guarantor-side computing device a first guarantor-side electronic form comprising an expandable grid, the expandable grid comprising editable guarantee fee pricing data, the first guarantor-side electronic form structured to perform operations comprising:
    in response to detecting a first guarantor-side user interaction via the guarantor-side computing device, identifying at least two user-highlighted cells in the expandable grid; and
    in a single electronic submission, changing at least two fee pricing data points according to values in the at least two user-highlighted cells;
generating, by the user interface logic, and displaying on the guarantor-side computing device a second guarantor-side electronic form comprising system settings, the system settings comprising a timeout value;
in response to detecting a second guarantor-side user interaction via the guarantor-side computing device, the second guarantor-side user interaction comprising a change to the timeout value in the system settings, setting the timeout value to a user-entered value; and
causing the seller-side committing system to:
    in response to detecting a first seller-side user interaction via a seller-side computing device, generating a seller-side display screen on the seller-side computing device, the seller-side display screen comprising dynamically updated fee pricing data points corresponding to the at least two fee pricing data points changed via the guarantor-side computing device, the seller-side display screen further comprising a timer comprising a time remaining to accept, the time remaining to accept set based on the timeout value supplied via the guarantor-side computing device; and
    in response to detecting a second seller-side user interaction via the seller-side computing device, determining that the timer has not expired; and
    based on a determination that the timer has not expired,
generating a new MBS commitment based on the updated fee pricing data points.

18. The non-transitory computer readable media of claim 17, wherein the display screens are further configured to display and download information pertaining to a commitment previously taken.

19. The non-transitory computer readable media of claim 17, wherein the display screens are further configured to receive information specifying a new commitment, pair-off or roll from an internal user acting on behalf of a seller.

20. The non-transitory computer readable media of claim 17, wherein the first guarantor-side electronic form comprises contemporaneously viewable controls, the contemporaneously viewable controls comprising:
- a first expandable data container configured to allow multiple sellers to be viewed simultaneously on the at least one of the display screens, and
- a second expandable data container configured to allow multiple products for at least one of the multiple sellers to be viewed simultaneously on the at least one of the display screens.

\* \* \* \* \*